United States Patent
Turek et al.

(10) Patent No.: US 10,968,080 B2
(45) Date of Patent: Apr. 6, 2021

(54) DRIVE BELT FOR PEOPLE CONVEYORS

(71) Applicant: Otis Elevator Company, Farmington, CT (US)

(72) Inventors: Alexander Turek, Münchendorf (AT); Andreas Glueck, Vienna (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/157,904

(22) Filed: Oct. 11, 2018

(65) Prior Publication Data
US 2019/0119076 A1  Apr. 25, 2019

(30) Foreign Application Priority Data
Oct. 19, 2017  (EP) .................... 17197370

(51) Int. Cl.
| B66B 23/14 | (2006.01) |
| B66B 23/02 | (2006.01) |
| B66B 21/10 | (2006.01) |
| B66B 21/02 | (2006.01) |
| B65G 15/42 | (2006.01) |
| B65G 17/24 | (2006.01) |
(Continued)

(52) U.S. Cl.
CPC ............ B66B 23/145 (2013.01); B66B 21/02 (2013.01); B66B 21/10 (2013.01); B66B 23/026 (2013.01); B66B 23/04 (2013.01); B65G 15/42 (2013.01); B65G 17/24 (2013.01); B65G 39/20 (2013.01); B66B 23/024 (2013.01)

(58) Field of Classification Search
CPC ........ B65G 15/60; B65G 15/36; B65G 39/20; B65G 15/42; B65G 17/24; B66B 23/026; B66B 21/10; B66B 21/02; B66B 23/145; B66B 23/04; F16G 1/28
USPC .......................................... 198/321
See application file for complete search history.

(56) References Cited

U.S. PATENT DOCUMENTS

| 2,823,789 A | 2/1958 | Rudolph |
| 3,191,743 A | 6/1965 | Rissler et al. |
(Continued)

FOREIGN PATENT DOCUMENTS

| CN | 1753828 A | 3/2006 |
| CN | 103130083 A | 6/2013 |
(Continued)

OTHER PUBLICATIONS

Dictionary.com, Jul. 16, 2020, https://www.dictionary.com/browse/gap?s=t (Year: 2020).*
(Continued)

*Primary Examiner* — Gene O Crawford
*Assistant Examiner* — Lester Rushin, III
(74) *Attorney, Agent, or Firm* — Cantor Colburn LLP (57) ABSTRACT

A drive belt (10; 20; 60) for a people conveyor comprises: a load bearing portion (12; 22; 62) extending in a longitudinal direction and having a length extending in the longitudinal direction and a width extending in a width direction; and a plurality of rollers (17; 27; 67) accommodated within the width of the load bearing portion (12; 22; 62). At least a part of the load bearing portion (12; 22; 62) is provided with a drive belt engagement structure (13; 23; 63). The drive belt engagement structure (13; 23; 63) in particular includes teeth (14, 25; 24), grooves (16; 26), and/or openings.

12 Claims, 13 Drawing Sheets

(51) Int. Cl.
*B65G 39/20* (2006.01)
*B66B 23/04* (2006.01)

(56) References Cited

U.S. PATENT DOCUMENTS

| | | | |
|---|---|---|---|
| 3,365,051 A | 1/1968 | Mullis et al. | |
| 3,967,720 A | 7/1976 | Arieh | |
| 4,170,348 A * | 10/1979 | Hoeink | G06K 13/07 |
| | | | 235/475 |
| 4,895,240 A | 1/1990 | Bruehl et al. | |
| 5,117,960 A * | 6/1992 | Ahls | B66B 23/04 |
| | | | 198/335 |
| 5,452,789 A | 9/1995 | Wolpers et al. | |
| 5,911,307 A * | 6/1999 | Kraft | B65G 15/64 |
| | | | 198/846 |
| 6,527,099 B2 | 3/2003 | Ostermeier et al. | |
| 6,540,060 B1 | 4/2003 | Fargo et al. | |
| 7,063,202 B2 | 6/2006 | Ossendorf | |
| 7,219,784 B2 | 5/2007 | Fargo | |
| 7,497,315 B2 | 3/2009 | Fargo et al. | |
| 10,053,294 B2 * | 8/2018 | DeGroot | B65G 15/42 |
| 10,214,389 B2 * | 2/2019 | Turek | B66B 21/02 |
| 2005/0279610 A1 | 12/2005 | Ossendorf | |
| 2006/0019783 A1* | 1/2006 | Hoag | A63B 22/0235 |
| | | | 474/148 |
| 2007/0137980 A1* | 6/2007 | Meyer | B66B 23/02 |
| | | | 198/327 |
| 2009/0139830 A1 | 6/2009 | Alemany et al. | |
| 2017/0081124 A1* | 3/2017 | Steinert | B65G 15/42 |
| 2017/0275139 A1 | 9/2017 | Turek et al. | |

FOREIGN PATENT DOCUMENTS

| | | | |
|---|---|---|---|
| DE | 1456375 A1 | 12/1968 | |
| DE | 1456376 A1 | 12/1968 | |
| DE | 2252763 A1 | 5/1974 | |
| DE | 10125686 A1 | 1/2003 | |
| EP | 3147239 B1 * | 1/2018 | F16G 1/28 |
| GB | 2195604 A | 4/1988 | |
| GB | 2553755 A * | 3/2018 | B65G 15/20 |
| WO | 2007146633 A2 | 12/2007 | |

OTHER PUBLICATIONS

European Search Report for application EP 17197370.4, dated Jun. 1, 2018, 9 pages.

Chinese First Office Action for application CN 201811223906.4, dated Nov. 1, 2019, 7 pages.

* cited by examiner

DRIVE BELT FOR PEOPLE CONVEYORS

BACKGROUND

The application relates to a drive belt for people conveyors and to a people conveyor comprising such a drive belt.

People conveyors such as escalators and moving walkways usually comprise a conveyance band, which is configured for conveying passengers. The conveyance band extends and moves between two opposing landing zones, and it is driven by at least one drive chain extending parallel to the conveyance band. A conventional drive chain has a considerable weight, needs regular maintenance and lubrication, and generates undesirable vibrations and noise when operated.

It therefore would be beneficial to provide an alternative driving means for driving the conveyance band which allows reducing or even avoiding the disadvantages associated with a conventional drive chain.

SUMMARY

According to an exemplary embodiment of the invention, a drive belt is configured for being used as a driving means in a people conveyor. The drive belt comprises a load bearing portion made of a flexible material and extending in a longitudinal direction, which is the direction of movement (conveying direction) of the drive belt. The load bearing portion has a length extending in said longitudinal direction, and a width extending in a width direction, which is oriented perpendicularly to the longitudinal direction. The drive belt further comprises a plurality of rollers accommodated within the width of the load bearing portion. At least one side of the load bearing portion is provided with a drive belt engagement structure. The drive belt engagement structure is configured for engaging with a corresponding drive element engagement structure, which is formed on a drive element of the people conveyor. The engagement structures in particular may include teeth, grooves, and/or openings.

Exemplary embodiments of the invention further include a drive system for a people conveyor, the drive system comprising at least one drive belt according to an exemplary embodiment of the invention and at least one drive element, in particular including a drive wheel, comprising a drive element engagement structure which is configured for engaging with the drive belt engagement structure for driving the drive belt.

Exemplary embodiments of the invention also include a people conveyor comprising such a drive system, a plurality of conveyance element axles attached to the drive belt, and conveyance elements, such as steps or pallets, attached to the conveyance element axles.

Replacing the drive chain(s) of a people conveyor by at least one drive belt according to an exemplary embodiment of the invention reduces the noise and vibrations generated when the people conveyor is operated. A drive belt according to exemplary embodiments of the invention has less weight than a conventional drive chain. As it does not need to be lubricated by means of oil or grease, the maintenance intervals may be extended. It further allows reducing the dimensions of the people conveyor; it in particular allows reducing the radii of the turnaround portions. Placing the rollers within the width of the load bearing portion results in a mechanical stable configuration. It further reduces the required space, particularly in the lateral direction.

A number of optional features are set out in the following. These features may be realized in particular embodiments, alone or in combination with any of the other features.

The load bearing portion may comprise a first cord extending in the longitudinal direction and a second cord extending parallel to the first cord in the longitudinal direction. The plurality of rollers may be sandwiched between the first and second cords. Such a configuration has a high mechanical stability since the rollers are supported symmetrically by the first and second cords.

The drive belt may comprise roller axles supporting the rollers and extending between the cords. Roller axles extending between the cords enhance the mechanical stability of the drive belt.

In case the drive belt engagement structure includes teeth, the roller axles may extend at least partially through some of the teeth. Extending the roller axle at least partially through some of the teeth provides an easy and convenient way of securely attaching the roller axles to the cords.

In an alternative configuration, the roller axles may be attached to a rear side of the cords, the rear side being opposite to the side on which the drive belt engagement structure is formed.

Conveyance element axles, which are configured for supporting conveyance elements such as pallets or steps, may be attached to the drive belt, in particular to at least one of the cords. The conveyance element axles in particular may be attached to at least some of the roller axles, for example to every third or fourth roller axle. Alternatively, the conveyance element axles may be attached to the cords separately from, in particular in between, the roller axles.

The distance between two adjacent conveyance element axles may be in the range of 300 mm to 500 mm, in particular between 350 mm and 450 mm, more particularly 400 mm.

The load bearing portion and/or the cords may be assembled from a plurality of cord segments, which are attached to each other in the longitudinal direction. Assembling the load bearing portion and/or the cords from a plurality of cord segments allows for an easy replacement of damaged cord segments without the need of replacing the whole load bearing portion and/or cord. It further allows compensating for manufacturing tolerances in the longitudinal direction. The length of the individual cord segments may correspond to the distance between adjacent conveyance element axles in the longitudinal direction, so that a single conveyance element axle is associated with each cord segment.

The cords of the drive belt may be formed integrally with each other in order to increase the mechanical stability of the drive belt even further. The drive belt in particular may comprise belt webs extending between the cords and openings formed between the cords for accommodating the rollers. The belt webs in particular may extend perpendicularly to the longitudinal direction.

The drive belts may be made of a material comprising polyurethane and/or rubber, in particular ethylene propylene rubber (EPDM). Reinforcing strands extending in the longitudinal direction may be embedded into the cords. The strands may be made of a material comprising steel, stainless-steel, carbon and/or aramid.

A drive system according to an exemplary embodiment of the invention may further comprise a roller guide element, in particular a roller guide wheel, which is configured for accommodating and guiding the rollers. A roller guide element in particular may be provided in turnaround portions of the drive system in which the drive belt is deflected.

The roller guide element in particular may be arranged coaxially with the at least one drive element. Providing a roller guide element results in an improved guidance of the rollers, in particular in the turnaround portions of the drive system.

The at least one drive element and/or drive wheel may have a diameter of less than 1000 mm, in particular a diameter between 250 mm and 750 mm, more particularly a diameter of 500 mm. Reducing the diameter of the drive element reduces the depth of a pit, which is needed for installing the drive system of a people conveyor. This facilitates the installation of the people conveyor and reduces the costs for installation.

A drive system according to an exemplary embodiment of the invention may comprise two drive belts extending parallel to each other, in particular laterally on both sides of the conveyance band, in order to allow for a symmetrical propulsion of the conveyance band.

In a people conveyor according to an exemplary embodiment of the invention the conveyance elements travel along a closed path comprising a conveyance portion and a return portion. When traveling along the conveyance portion, the at least one drive belt may be arranged under the conveyance elements. Such a configuration allows reducing the lateral dimension of the people conveyor without reducing the width of the conveyance elements.

In an alternative configuration, the at least one drive belt may be arranged alongside the conveyance elements traveling along the conveyance portion.

BRIEF DESCRIPTION OF THE DRAWINGS

In the following exemplary embodiments of the invention are described with reference to the enclosed figures.

DETAILED DESCRIPTION

Figure 1:
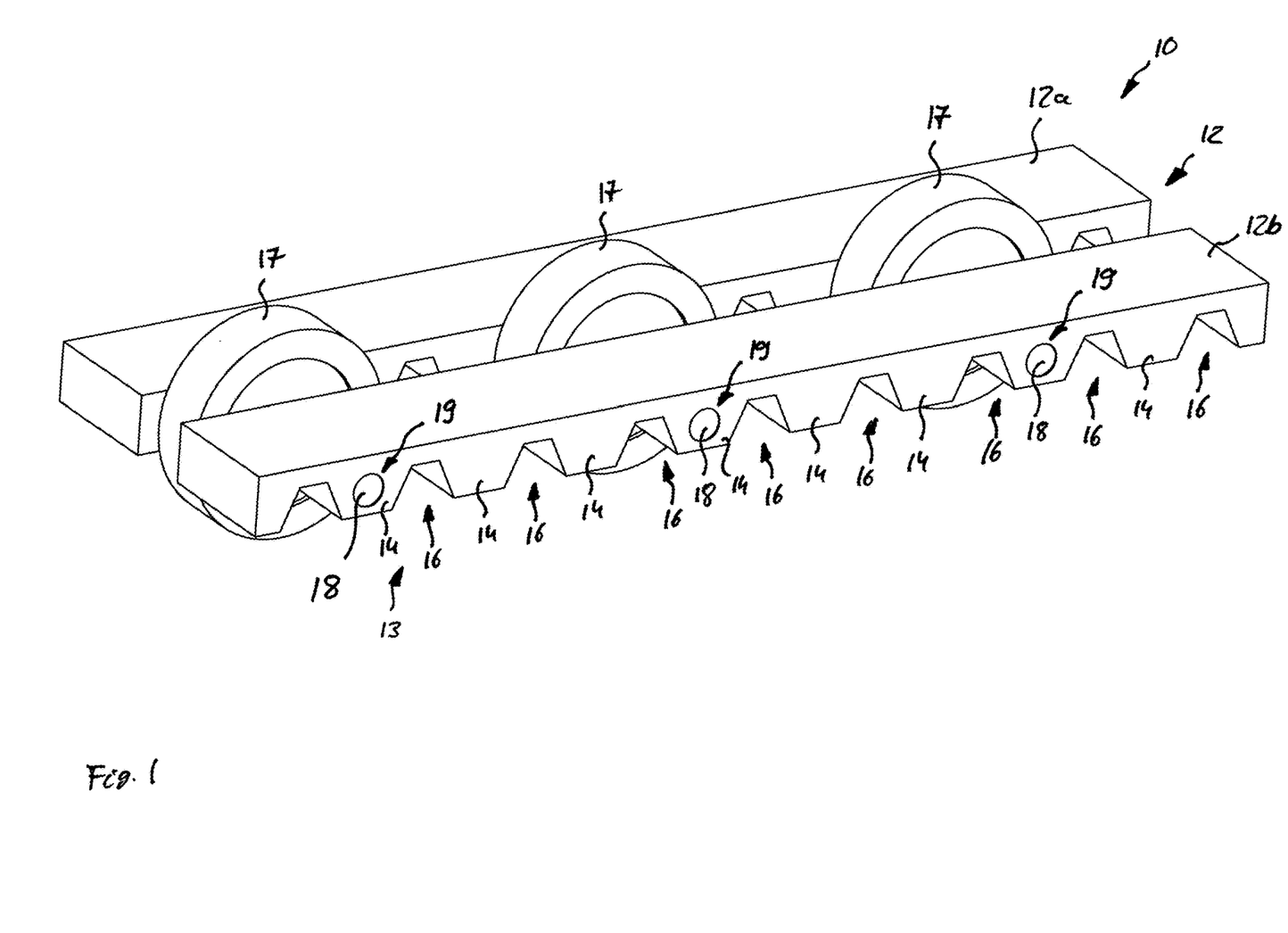
FIG. 1 shows a perspective view of a section of a drive belt according to an exemplary embodiment of the invention.
Figure 2:
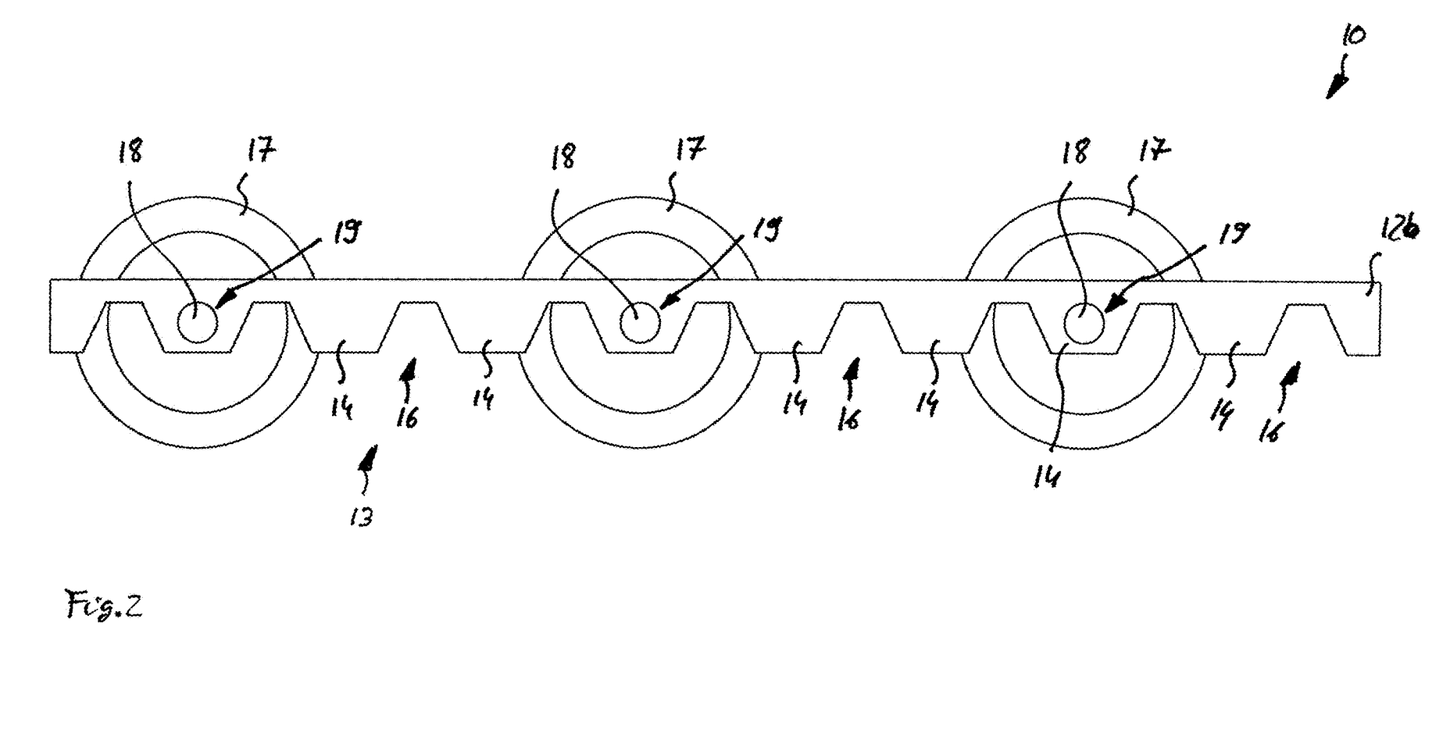
FIG. 2 shows a side view of the section of the drive belt shown in FIG. 1.

FIG. 1 shows a perspective view of a section of a drive belt 10 according to an exemplary embodiment of the invention; and FIG. 2 shows a side view thereof.

The drive belt 10 has a load bearing portion 12 comprising two cords 12a, 12b extending in the longitudinal direction (from left to right in FIGS. 1 and 2). The cords 12a, 12b are made of a flexible material. A drive belt engagement structure 13 comprising alternating teeth 14 and grooves 16 is formed on one side (the lower side in the orientation of the drive belt 10 shown in FIGS. 1 and 2) of each cord 12a, 12b.

Roller axles 18 extend between the two cords 12a, 12b, in particular perpendicularly to the longitudinal direction. The roller axles 18 are accommodated in roller axle openings 19 formed within some of the teeth 14.

A roller 17 is supported by each roller axle 18 via a roller bearing (not shown). In consequence, the rollers 17 are sandwiched between the two cords 12a, 12b and are able rotate freely around their respective axles 18. In alternative embodiments, which are not shown in the figures, two or more rollers 17 may be supported coaxially with each other on each of the axles 18.

In the embodiment shown in FIGS. 1 and 2, roller axles 18 are accommodated in every third tooth 14. The skilled person, however, will understand that this is only exemplary and that the number of roller axles 18 with respect to the number of teeth 14 may be chosen differently according to the respective circumstances, which in particular include the diameter of the rollers 17.

Figure 3:
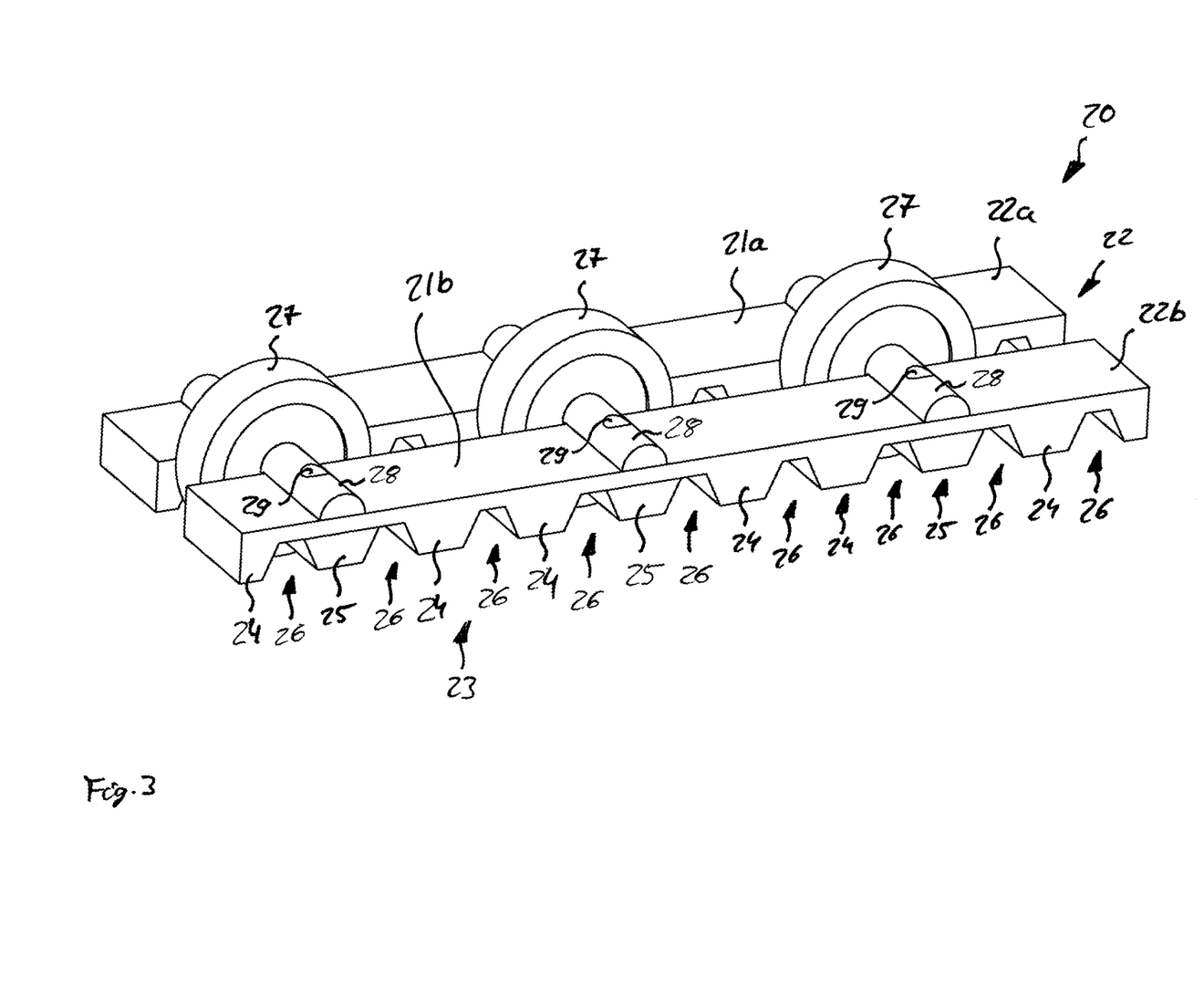
FIG. 3 shows a perspective view of a section of a drive belt according to another exemplary embodiment of the invention.
Figure 4:
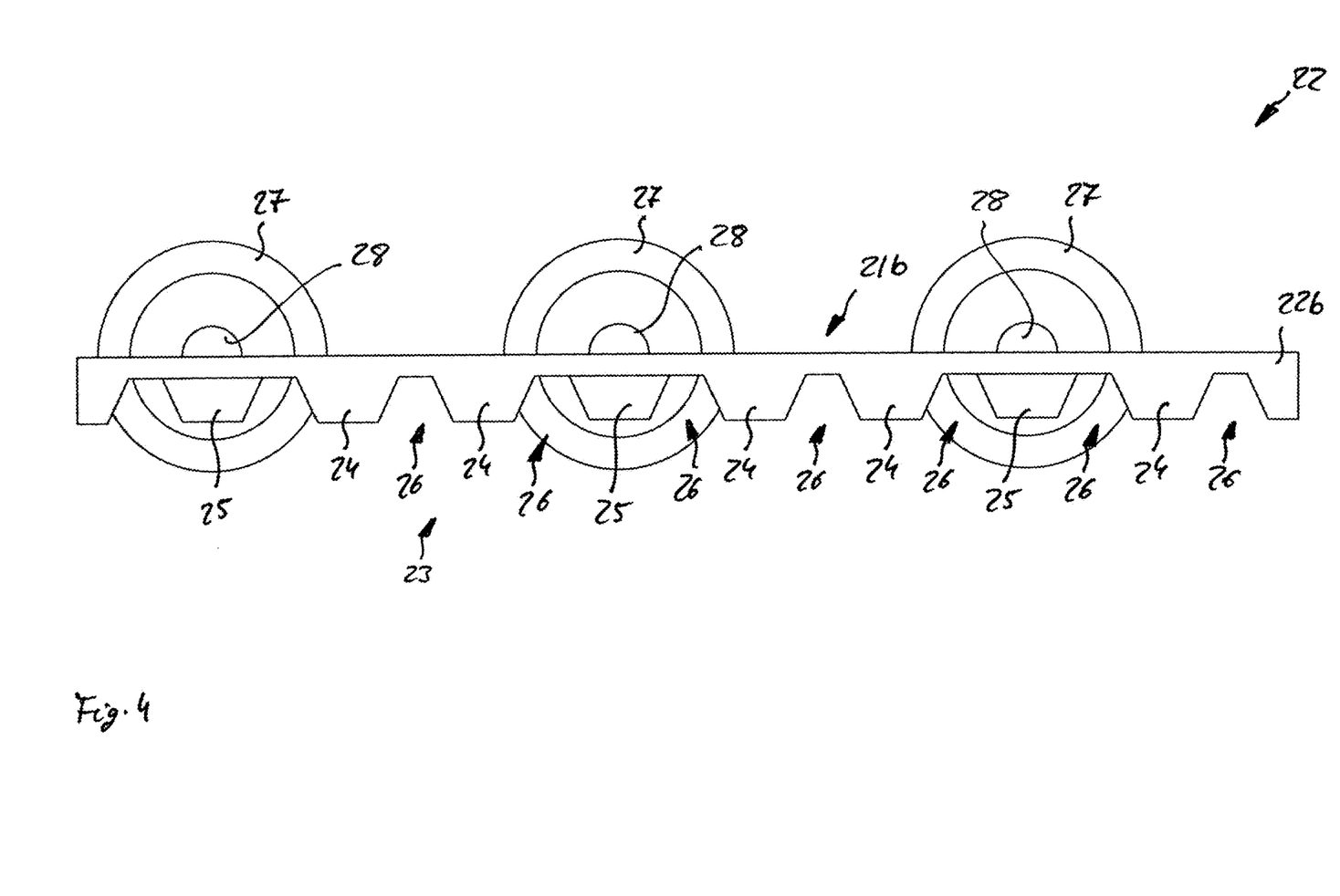
FIG. 4 shows a side view of the section of the drive belt shown in FIG. 3.

FIG. 3 shows a perspective view of a section of a drive belt 20 according to another exemplary embodiment of the invention, and FIG. 4 shows a side view thereof.

The drive belt 20 depicted in FIGS. 3 and 4 also has a load bearing portion 22 comprising two cords 22a, 22b made of a flexible material and extending in the longitudinal direction. A drive belt engagement structure 23 comprising alternating teeth 24, 25 and grooves 26 is formed on one side (the lower side in FIGS. 3 and 4) of each cord 22a, 22b.

Roller axles 28 supporting rollers 27 extend between the two cords 22a, 22b perpendicularly to the longitudinal direction. The roller axles 28 are mounted to a rear side 21a, 21b of the cords 22a, 22b. The rear side 21a, 21b, which is facing upwards in FIGS. 3 and 4, is the side opposite to the side of the cords 22a, 22b on which the drive belt engagement structure 23 is formed. The roller axles 28 in particular are mounted to the cords 22a, 22b by means of bolts or screws 29 extending through the cords 22a, 22b into corresponding teeth 25 of the drive belt engagement structure 23.

The corresponding teeth 25 may be formed integrally with the respective cord 22a, 22b. Alternatively, the corresponding teeth 25 may be provided as separate elements, which are not formed integrally with the respective cord 22a, 22b, but which are fastened to the cords 22a, 22b together with the roller axles 28 by the bolts or screws 29.

As in the embodiment shown in FIGS. 1 and 2, the roller axles 28 are mounted to every third tooth 25. Again, the skilled person will understand that this is only exemplary and that the number of rollers 27 and roller axles 28 with respect to the number of teeth 24, 25 may be chosen differently depending on the respective circumstances.

Figure 5:
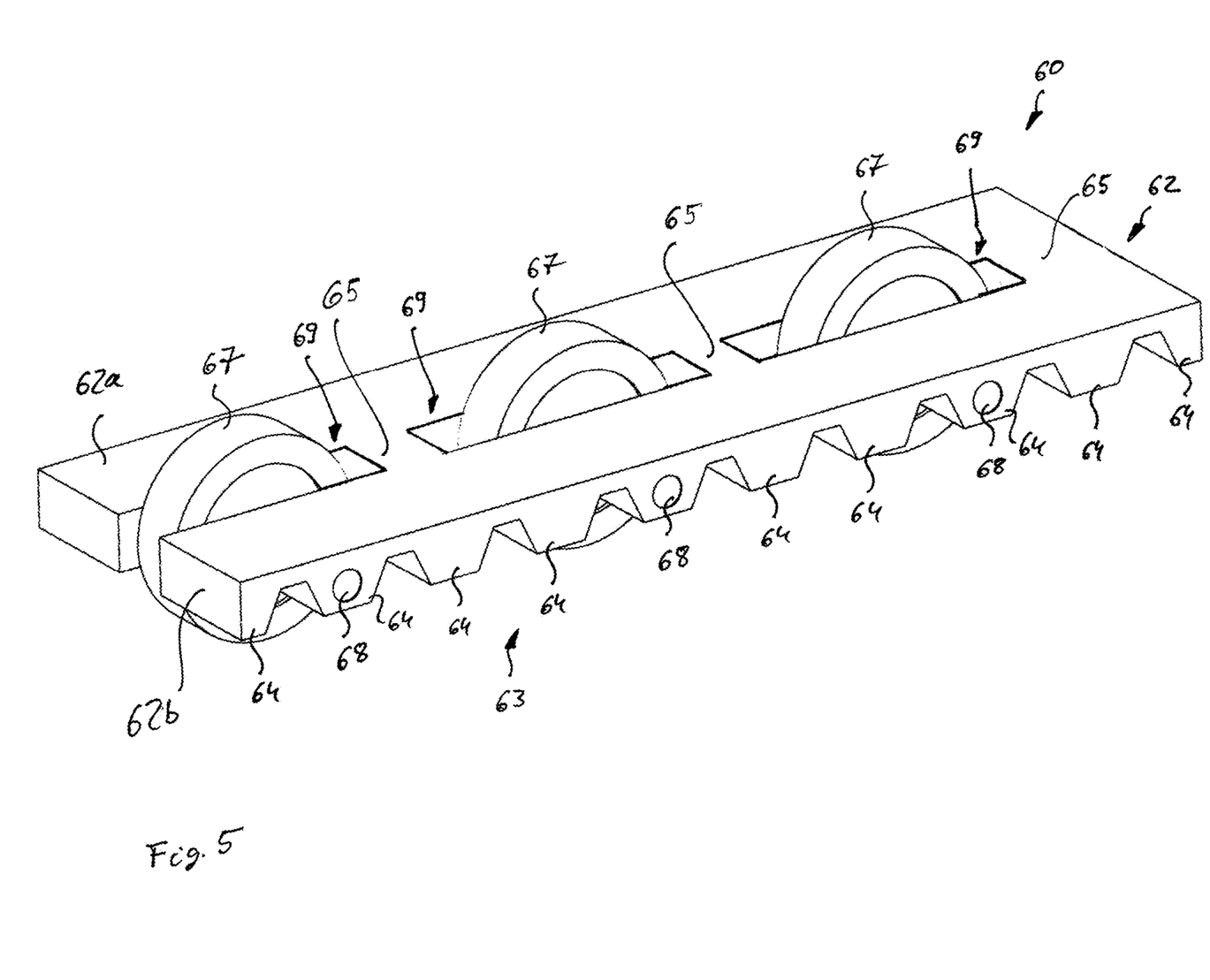
FIG. 5 shows a perspective view of a section of a drive belt according to yet another exemplary embodiment of the invention.

FIG. 5 depicts yet another embodiment of a drive belt 60, comprising two cords 62a, 62b extending parallel to each other, wherein the cords 62a, 62b are formed integrally with each other forming an integral load bearing portion 62.

The drive belt 60 in particular comprises a plurality of belt webs 65 extending between the cords 62a, 62b and openings 69, which are formed between the cords 62a, 62b and the belt webs 65 for accommodating the rollers 67. Similar to the embodiment shown in FIGS. 1 and 2, roller axles 68 extending between the two cords 62a, 62b are supported by some of the teeth 64 of the drive belt engagement structure 63. In an alternative configuration, which is not shown in the figures, the roller axles 68 may be attached to the rear sides 61 of the cords 62a, 62b, similar to the configuration shown in FIGS. 3 and 4.

Optionally, the cords 12a, 12b, 22a, 22b, 62a, 62b of each drive belt 10, 20, 60 may be assembled from a plurality of cord segments 70, 72.

Figure 6:
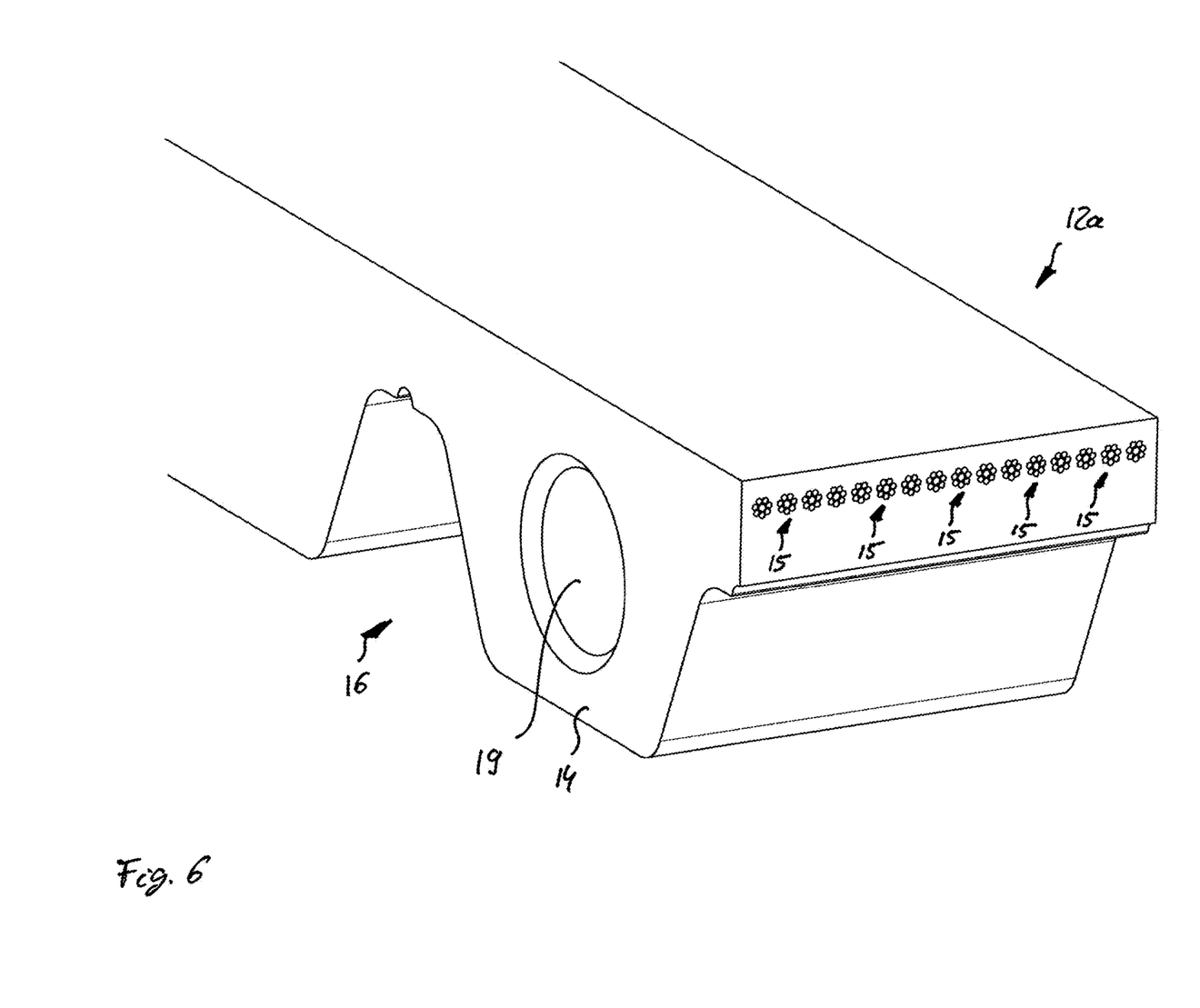
FIG. 6 shows a sectional view of a cord according to an exemplary embodiment of the invention.

FIG. 6 shows a sectional view of a cord 12a according to an exemplary embodiment of the invention. FIG. 6 in particular depicts reinforcing strands 15 embedded into the cord 12a and extending in the longitudinal direction of the cord 12a. The reinforcing strands 15 may be made of a material comprising steel, stainless-steel, carbon and/or aramid. For clarity, not all reinforcing strands 15 are provided with reference signs in FIG. 6.

Figure 7A:
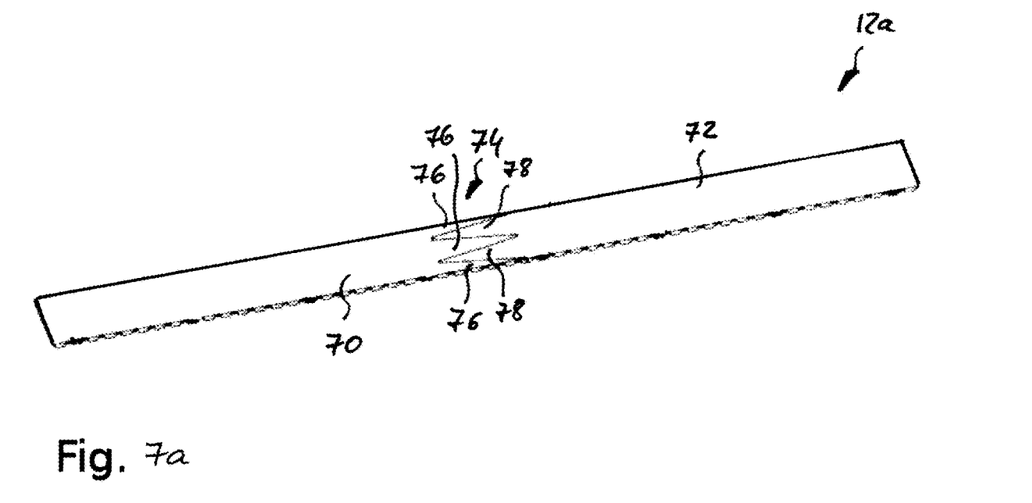
FIG. 7a shows a perspective view of a section of a cord, which is assembled by a plurality of cord segments.

FIG. 7a illustrates a section of a cord 12a, which is assembled from a plurality of cord segments 70, 72. In particular two cord segments 70, 72 are shown in FIG. 7a. The two cord segments 70, 72 are connected to each other by a splicing 74. At its respective ends, each cord segment 70, 72 is split apart into a plurality of straps 76, 78. The straps 76, 78 are alternately connected to each other e.g. by means of welding or by means of appropriate belt locking mechanisms (not shown) for forming the connected configuration shown in FIG. 7a.

Figure 7B:
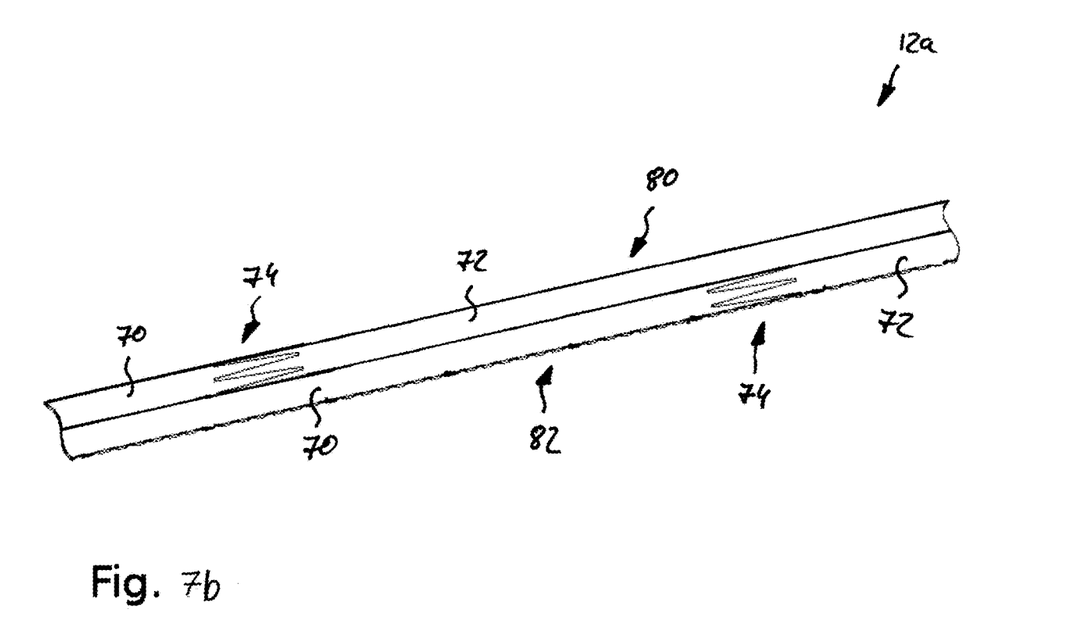
FIG. 7b shows a configuration in which the cord comprises a plurality of sub-cords extending parallel to each other.

FIG. 7b shows a configuration in which the cord 12a comprises a plurality of sub-cords 80, 82 extending parallel to each other. Each sub-cord 80, 82 is assembled from a plurality of cord segments 70, 72, which are connected to each other by splicings 74, similar to the configuration shown in FIG. 7a. The splicings 74 of the different sub-cords 80, 82 are displaced with respect to each other in the longitudinal direction. This enhances the total strength of the cord 12a, as the splicings 74, which may result in weak portions of the cord 12a, are distributed along the longitudinal direction and every splicing 74 is supported by a non-spliced portion of the other sub-cord 80, 82.

Assembling the cords 12a from a plurality of cord segments 70, 72 allows for an easy replacement of damaged cord segments without the need of replacing the whole cord 12a. It further allows compensating for manufacturing tolerances.

Figure 8:
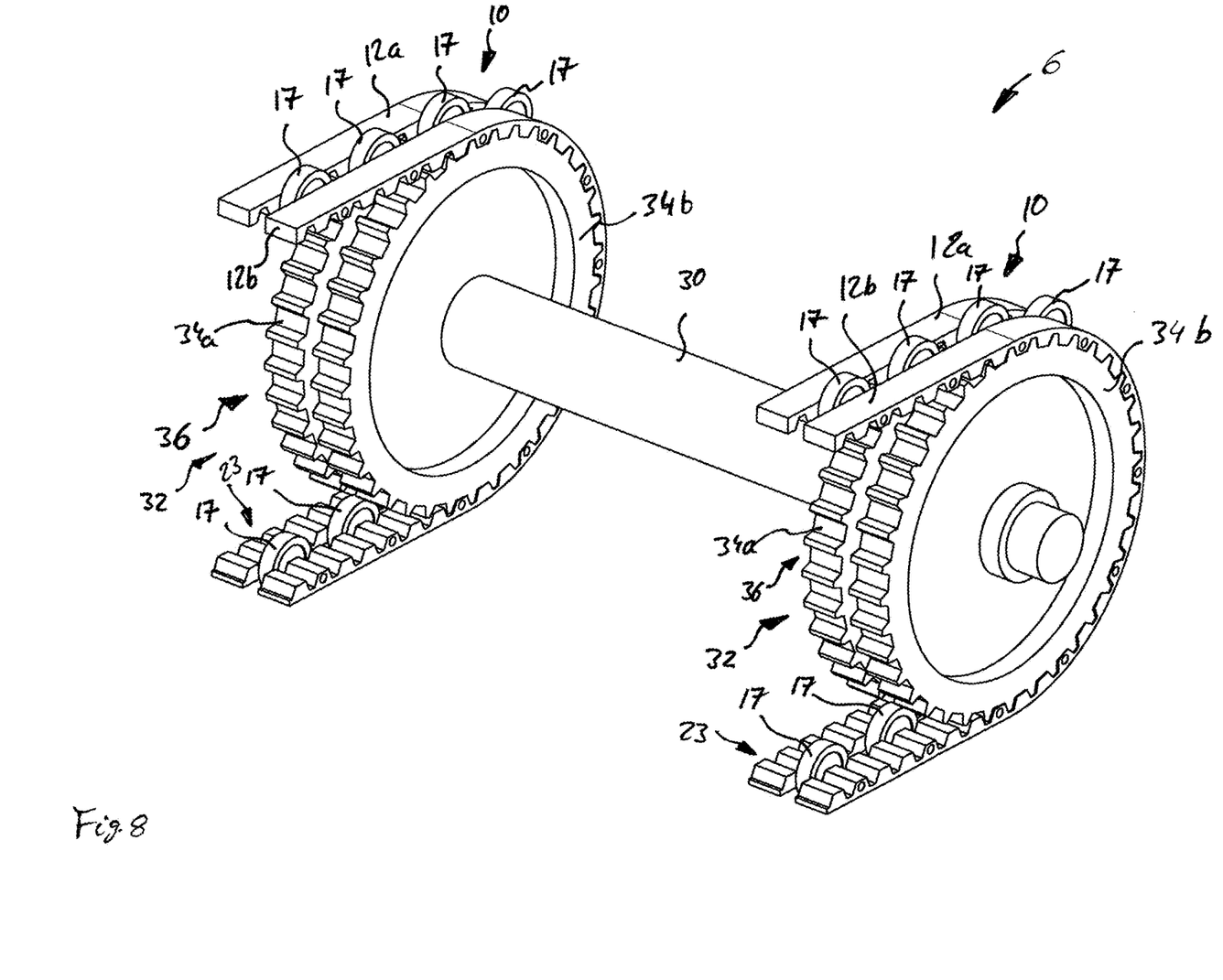
FIG. 8 shows a perspective view of a turnaround portion of a chain drive with sections of two drive belts according to an exemplary embodiment of the invention.

FIG. 8 shows a perspective view of sections of two drive belts 10 according to an exemplary embodiment of the invention which are arranged in a turnaround portion 6, in which the drive belts 10 are deflected. The drive belts 10 shown in FIG. 8 and the following figures correspond to the drive belts 10 shown in FIGS. 1 and 2. The skilled person, however, will understand that other embodiments of the drive belts 10, 20, 60, in particular drive belts 20, 60 as they are shown in FIGS. 3 to 5 including drive belts 10, 20, 60 which are assembled from a plurality of segments 70, 72 as shown in FIGS. 6 and 7, may be employed correspondingly.

In the turnaround portion 6, two drive elements 32 are arranged coaxially on a common axle 30. The common axle 30 and/or drive elements 32 may be driven by an appropriate drive unit, which is not shown in the figures.

Each drive element 32 includes first and second drive wheels 34a, 34b, which are arranged parallel to and coaxially with each other on the common axle 30. The first and second drive wheels 34a, 34b of each drive element 32 are spaced apart from each other in the axial direction for accommodating the rollers 17 in a gap which is formed between the first and second drive wheels 34a, 34b.

A drive element engagement structure 36 matching the drive belt engagement structure 13 formed on the drive belts 10 is formed on the outer circumference of each drive wheel 34a, 34b. As a result, each drive belt 10 is in structural engagement with the drive wheels 34a, 34b of one of the drive elements 32, and the drive belts 10 may be driven by rotationally driving the drive elements 32.

Figure 9:
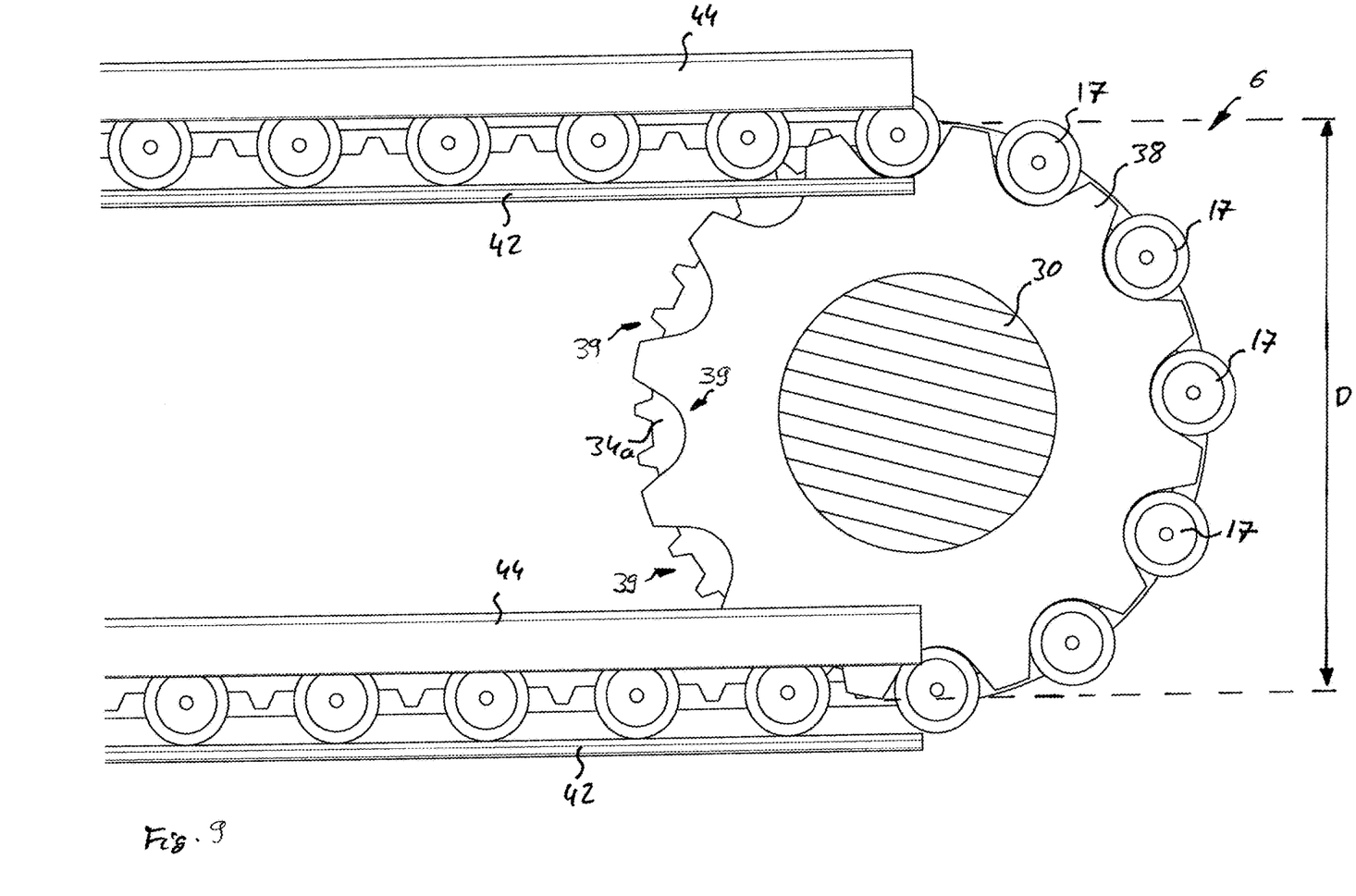
FIG. 9 shows a side view of a turnaround portion according to another exemplary embodiment of the invention.

FIG. 9 shows a side view of a turnaround portion 6 according to another exemplary embodiment of the invention. In FIG. 9, one of the first and second drive wheels 34a, 34b is not shown in order to show an optional roller guide wheel 38, which is arranged in the gap formed between the first and second drive wheels 34a, 34b. (There is no such roller guide wheel 38 in the configuration shown in FIG. 8.)

The roller guide wheel 38 is arranged on the axle 30 coaxially with the first and second drive wheels 34a, 34b and configured to rotate integrally with the first and second drive wheels 34a, 34b. On the outer circumference of the roller guide wheel 38, a plurality of recesses 39 are formed for accommodating the rollers 17 of the drive belt 10. In consequence, the roller guide wheel 38 guides the rollers 17 around the turnaround portion 6.

FIG. 9 further shows guide rails 42, 44, which are provided for guiding the rollers 17 upstream and downstream of the roller guide wheel 38.

The diameter D of the drive wheels 34a, 34b may be smaller than the diameter of drive wheels employed in conventional people conveyors comprising a drive chain. The drive wheels 34a, 34b in particular may have a diameter D of less than 1000 mm, in particular a diameter between 250 mm and 750 mm, more particularly a diameter of 500 mm. Reducing the diameter D of the drive wheels 34a, 34b reduces the space needed for the turnaround portion 6, in particular in the vertical direction.

Figure 10:
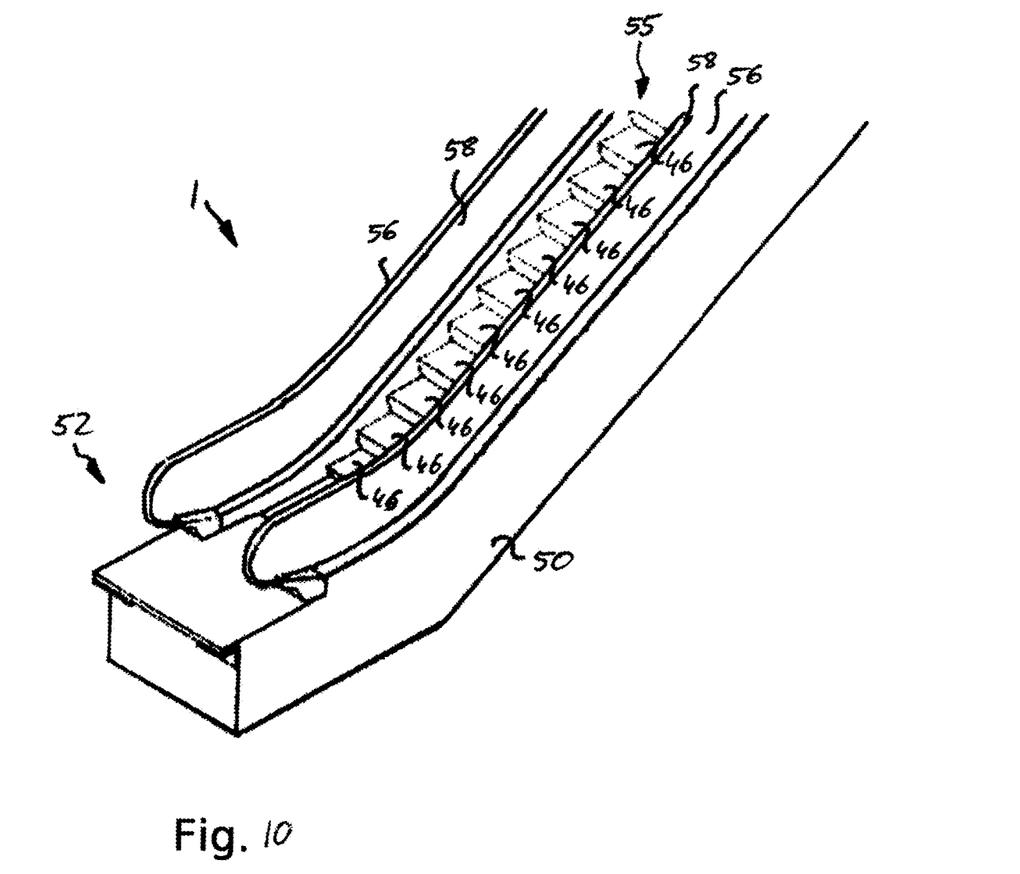
FIG. 10 shows a perspective view of a portion of a people conveyor in which a drive belt according to an exemplary embodiment of the invention may be employed.

FIG. 10 shows a perspective view of a portion of a people conveyor 1 in which a drive belt 10, 20, 60 according to an exemplary embodiment of the invention may be employed.

The people conveyor 1 shown in FIG. 10 is an escalator comprising a conveyance band 55 formed of a plurality of conveyance elements (steps) 46. The people conveyor 1 comprises a truss 50 extending in the longitudinal conveying direction between a lower landing zone 52 and a corresponding upper landing zone 54 (see FIG. 11), which is not shown in FIG. 10. Two balustrades 56 supporting moving handrails 58 extend parallel to the conveyance band 55.

Figure 11:
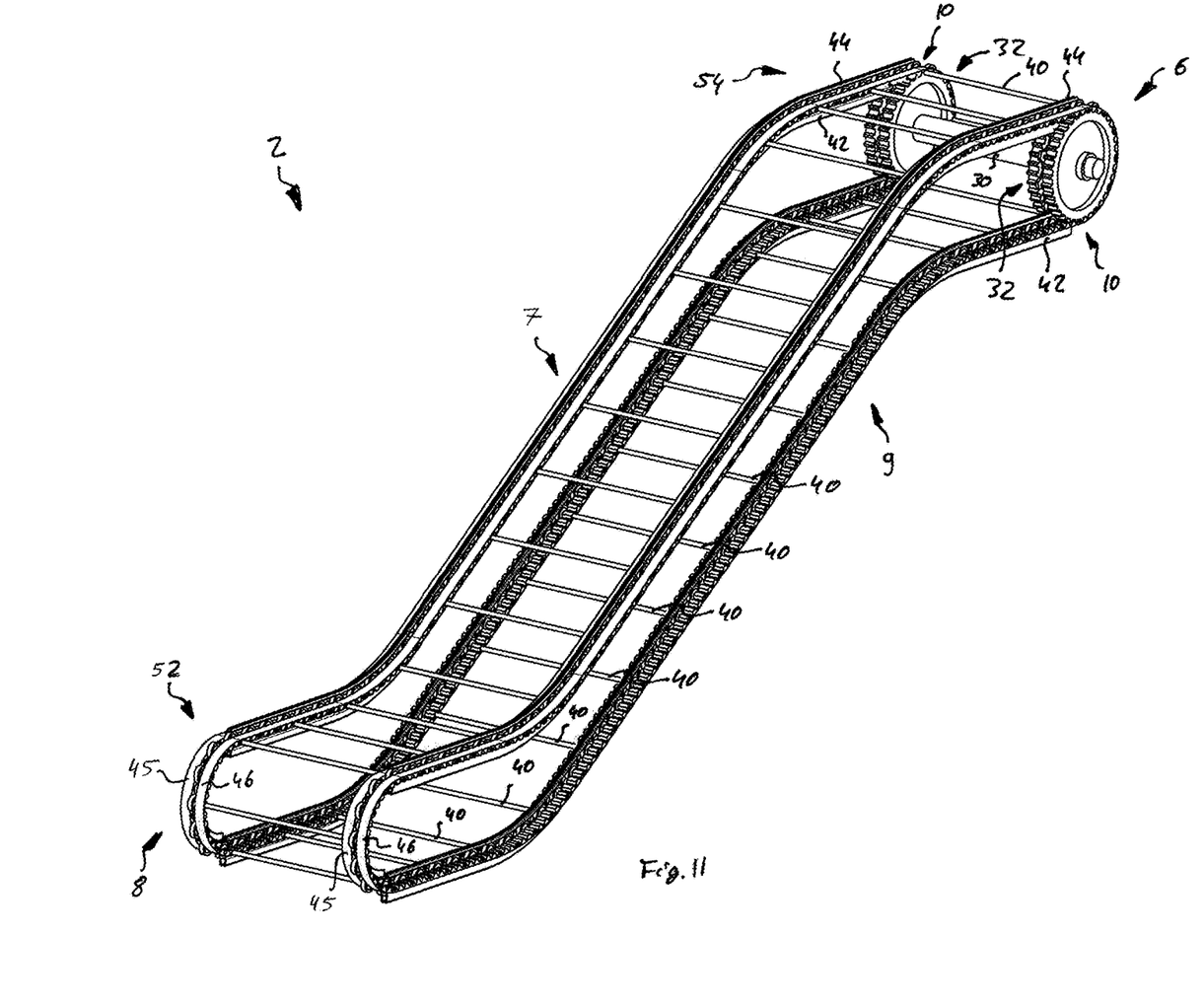
FIG. 11 illustrates a drive system of an escalator according to an exemplary embodiment of the invention.

FIG. 11 illustrates a drive system 2 of the people conveyor (escalator) 1. The drive system 2 comprises two drive belts 10 according to an exemplary embodiment of the invention. The drive belts 10 extend parallel to each other between an upper turnaround portion 6, which is located at the upper landing zone 54, and a lower turnaround portion 8, which is located at the lower landing zone 52.

The upper turnaround portion 6 shown in FIG. 11 corresponds to the turnaround portion 6 shown in FIG. 9. In the embodiment shown in FIG. 11, no drive or guide wheels 34a, 34b, 38 are arranged in the lower turnaround portion 8. Instead, the drive belts 10 are guided through the lower turnaround portion 8 by curved guide rail portions 45.

In alternative embodiments, which are not shown in the figures, drive and/or guide wheels 34a, 34b, 38 may be provided in the lower turnaround portion 8 alternatively or in addition to the drive and guide wheels 34a, 34b, 38 provided in the upper turnaround portion 6.

The rollers 17 are guided by straight portions of the guide rails 42, 44 along an inclined conveyance portion 7 and a corresponding return portion 9, which both extend between the two turnaround portions 6, 8.

A plurality of conveyance element axles (step axles) 40 extend between the two drive belts 10 perpendicularly to the longitudinal (conveyance) direction. The conveyance element axles 40 are spaced equidistantly from each other in the longitudinal direction. The distance between two adjacent conveyance element axles 40 may be between 300 mm and 500 mm, in particular between 350 mm and 450 mm, more particularly 400 mm.

The conveyance element axles 40 may be mounted to or formed integrally with selected roller axles 18. Alternatively, the conveyance element axles 40 may be mounted to the drive belts 10 separately from the roller axles 18.

The conveyance element axles 40 are configured for supporting the conveyance elements 46 of the people conveyor 1 (cf. FIG. 10), which are not shown in FIG. 11.

In case the cords 12a, 12b of the drive belt 10 are assembled from a plurality of cord segments 70, 72, as illustrated in FIGS. 6 and 7, the length of the cord segments 70, 72 may correspond to the distance between adjacent conveyance element axles 40 so that a single conveyance element axle 40 is associated with each cord segment 70, 72.

Figure 12:
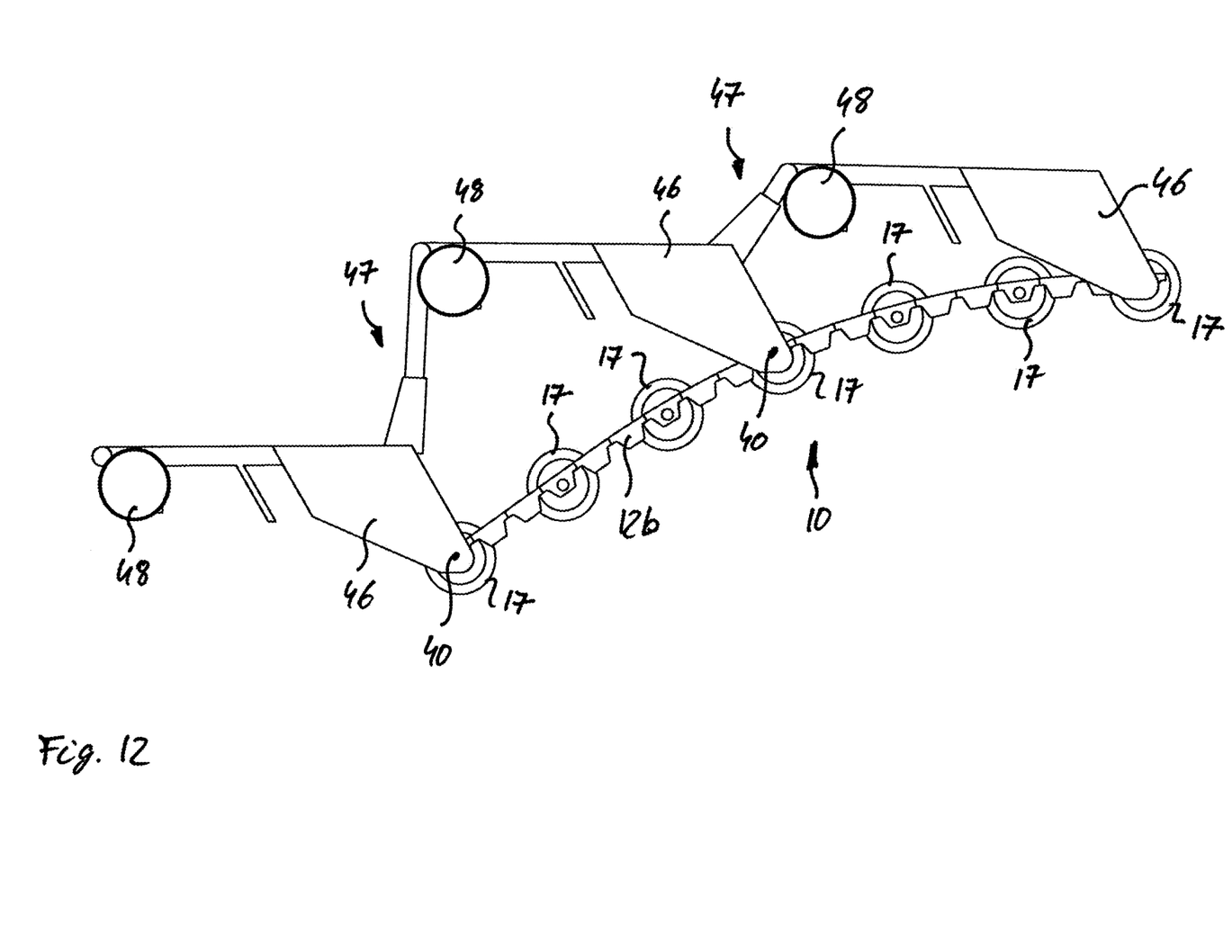
FIG. 12 shows a side view of a plurality of steps mounted to a section of drive belt.
Figure 13:
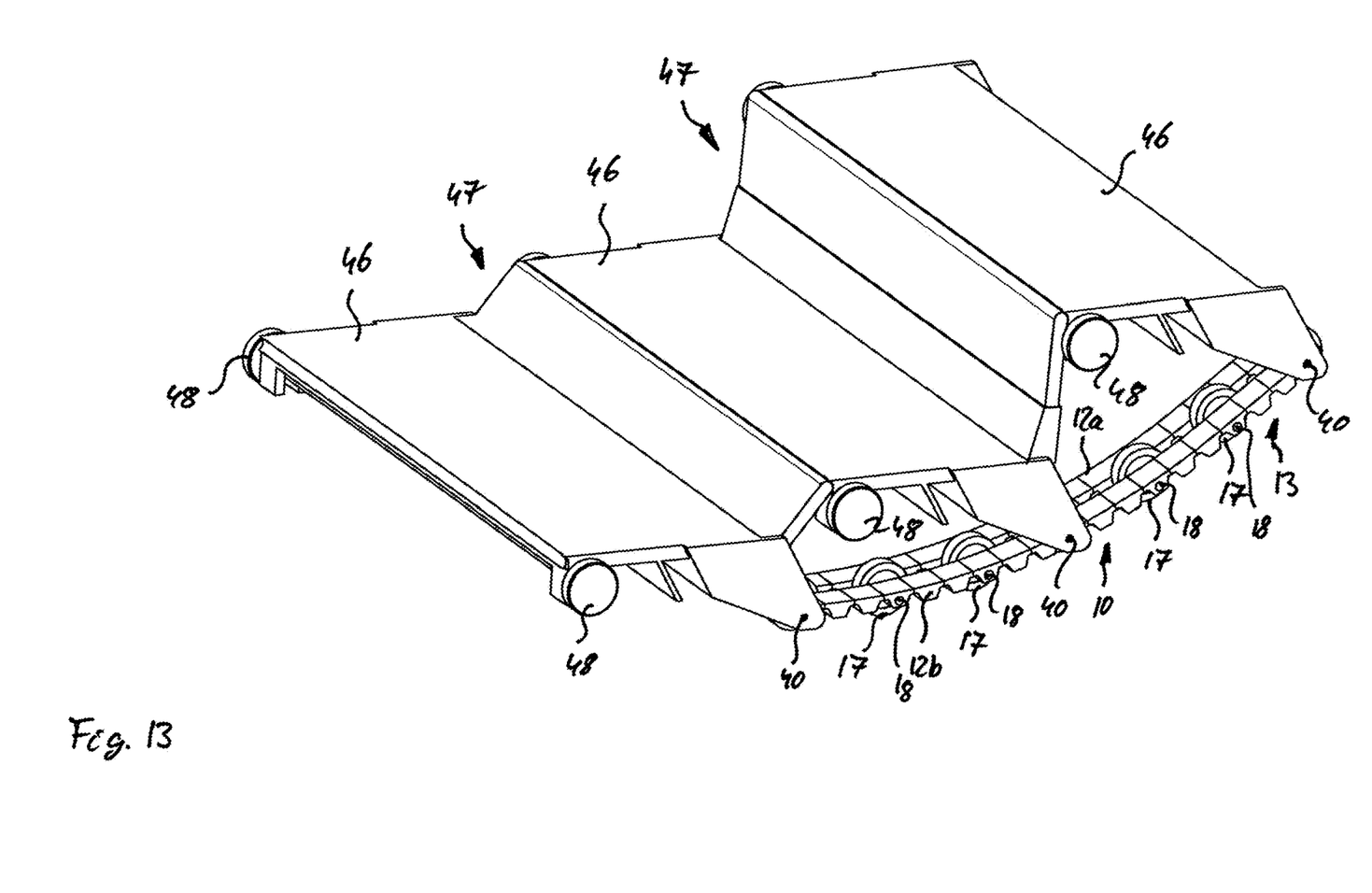
FIG. 13 shows a perspective view of the configuration shown in FIG. 12.

FIG. 12 shows a side view of a plurality of conveyance elements 46 mounted by means of the conveyance element axles 40 to a section of drive belt 10 according to an exemplary embodiment of the invention; and FIG. 13 shows a perspective view thereof.

In the embodiment shown in FIGS. 12 and 13, the conveyance elements 46 are provided as steps comprising movable, in particular telescopic, riser portions 47. This, however, is not mandatory and the skilled person will understand that drive belts 10, 20, 60 according to exemplary embodiments of the invention may be employed with any kind of conveyance elements 46, in particular including conventional steps and bucket steps, which are not shown in the figures.

The conveyance elements 46 comprise conveyance element rollers (step rollers) 48. The conveyance elements rollers 48 are supported and guided by conveyance elements roller guide rails, which are not shown in the figures.

For reducing the lateral dimension of the people conveyor 1, the drive belts 10 according to exemplary embodiments of the invention may be arranged under the conveyance elements 46, as it is illustrated in FIGS. 9 and 10.

In an alternative configuration, which is not shown in the figures, the drive belts 10 may be arranged besides the conveyance elements 46.

Although in FIGS. 10 to 13 the use of drive belts 10 according to exemplary embodiments of the invention is shown for an escalator comprising a plurality of steps as conveyance elements 46, the skilled person will understand that drive belts 10, 20, 60 according to exemplary embodiments of the invention may be employed correspondingly in horizontal or inclined moving walkways comprising a plurality of pallets instead of steps.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiments disclosed, but that the invention include all embodiments falling within the scope of the dependent claims.

REFERENCES 1 people conveyor
2 drive system
6 (upper) turnaround portion
7 conveyance portion
8 lower turnaround portion
9 return portion
10 drive belt
12 load bearing portion
12a first cord
12b second cord
13 drive belt engagement structure
14 tooth
15 reinforcing strand
16 groove
17 roller
18 roller axle
19 roller axle opening
20 drive belt
22 load bearing portion
22a first cord
22b second cord
23 drive belt engagement structure
24 tooth
25 tooth
26 groove
27 roller
28 roller axle
30 axle
32 drive element
34a first drive wheel
34b second drive wheel
36 drive element engagement structure
38 guide wheel
40 conveyance element axle
42, 44 guide rails
45 curved guide rail portion
46 conveyance elements
47 telescopic riser portion
50 truss
52 lower landing zone
54 upper landing zone
55 conveyance band
56 balustrade
58 handrail
60 drive belt
62 load bearing portion
62a first cord
62b second cord
63 drive belt engagement structure
64 tooth
65 web
66 groove
67 roller
68 roller axle
69 opening
70, 72 cord segments
74 splicing
76, 78 straps
80, 82 sub-cords

What is claimed is:

1. Drive belt for a people conveyor comprising:
a load bearing portion extending in a longitudinal direction and having a length extending in the longitudinal direction and a width extending in a width direction; and
a plurality of rollers accommodated within the width of the load bearing portion;
wherein at least a part of the load bearing portion is provided with a drive belt engagement structure, wherein the drive belt engagement structure in particular includes teeth, grooves, and/or openings;
wherein the load bearing portion comprises:
a first cord extending in the longitudinal direction; and
a second cord extending parallel to the first cord in the longitudinal direction; and
wherein roller axles supporting the rollers are mounted to a rear side of the first and second cords, the rear side of the first and second cords being opposite to a front side of the first and second cords, the drive belt engagement structure formed on the front side.

2. Drive belt according to claim 1, wherein the roller axles extend at least partially through said teeth.

3. Drive belt according to claim 2 further comprising conveyance element axles which are attached to at least some of the roller axles.

4. Drive belt according to claim 1 further comprising conveyance element axles attached to the drive belt.

5. Drive belt according to claim 4, wherein the distance between two adjacent conveyance element axles in the longitudinal direction is between 300 mm and 500 mm.

6. Drive system for a conveyor system comprising
at least one drive belt according to claim 1; and
at least one drive element which is configured for engaging with the drive belt engagement structure of the at least one drive belt.

7. Drive system according to claim 6, wherein the at least one drive belt comprises first and second cords each of which comprises the drive belt engagement structure, and wherein the drive element comprises first and second drive wheels which are arranged coaxially to each other, each drive wheel engaging with the drive belt engagement structure of one of the first and second cords, respectively.

8. Drive system according to claim 6, comprising a roller guide element which is configured for accommodating and guiding the rollers.

9. Drive system according to claim 6, wherein the at least one drive element comprises a drive wheel having a diameter of less than 1000 mm.

10. Drive system according to claim 6, comprising two drive belts arranged coaxially with each other.

11. People conveyor comprising
a drive system according to claim 6;
conveyance element axles which are attached to at least one of the drive belts; and
conveyance elements, such as steps or pallets, attached to the conveyance element axles.

12. People conveyor according to claim 11, wherein the conveyance elements travel along a path comprising a conveyance portion and a return portion, and wherein the at least one drive belt is arranged under the conveyance elements when travelling along the conveyance portion.

* * * * *